United States Patent
Gouerec

(10) Patent No.: US 11,524,518 B2
(45) Date of Patent: Dec. 13, 2022

(54) LEAD CASING FOR PENCIL, AND PENCIL THEREOF FOR WRITING, DRAWING, MARKING, PLOTTING, AND COLORING

(71) Applicant: SOCIÉTÉ BIC, Clichy (FR)

(72) Inventor: Julien Gouerec, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/415,545

(22) PCT Filed: Dec. 17, 2019

(86) PCT No.: PCT/EP2019/085722
§ 371 (c)(1),
(2) Date: Jun. 17, 2021

(87) PCT Pub. No.: WO2020/127320
PCT Pub. Date: Jun. 25, 2020

(65) Prior Publication Data
US 2022/0055397 A1    Feb. 24, 2022

(30) Foreign Application Priority Data

Dec. 18, 2018 (EP) ..................... 18306714

(51) Int. Cl.
| | | |
|---|---|---|
| B43K 19/14 | (2006.01) | |
| B29C 48/154 | (2019.01) | |
| B43K 19/02 | (2006.01) | |
| B29C 48/00 | (2019.01) | |
| B43K 19/16 | (2006.01) | |
| B29K 105/00 | (2006.01) | |
| B29K 707/00 | (2006.01) | |
| B29L 31/00 | (2006.01) | |

(52) U.S. Cl.
CPC ............ *B43K 19/14* (2013.01); *B29C 48/022* (2019.02); *B29C 48/154* (2019.02); *B43K 19/02* (2013.01); *B43K 19/16* (2013.01); *B29K 2105/0005* (2013.01); *B29K 2707/00* (2013.01); *B29L 2031/7254* (2013.01)

(58) Field of Classification Search
CPC .................................................. B43K 19/14
See application file for complete search history.

(56) References Cited

U.S. PATENT DOCUMENTS

| | | | | |
|---|---|---|---|---|
| 3,704,071 A | * | 11/1972 | Muller ................. | B29C 44/507 264/173.17 |
| 5,916,950 A | * | 6/1999 | Obuchi ................. | C08L 67/02 528/359 |
| 6,572,295 B1 | | 6/2003 | Bachelet et al. | |
| 9,988,546 B2 | | 6/2018 | Claptien et al. | |
| 10,308,063 B2 | | 6/2019 | Claptien et al. | |
| 10,814,665 B2 | | 10/2020 | Gouerec et al. | |
| 11,123,905 B2 | * | 9/2021 | Kaplancali ........... | C08K 5/0041 |
| 2007/0223985 A1 | * | 9/2007 | Bourgeois ............ | A45D 40/16 264/239 |
| 2015/0291784 A1 | * | 10/2015 | Ruef ..................... | C08L 23/12 524/13 |

FOREIGN PATENT DOCUMENTS

| | | | | | |
|---|---|---|---|---|---|
| CN | 109486231 | A | * | 3/2019 | |
| DE | 19855325 | | | 6/1999 | |
| EP | 2631060 | | | 8/2013 | |
| EP | 2644407 | | | 10/2013 | |
| FR | 2988643 | | | 10/2013 | |
| GB | 1448057 | A | * | 9/1976 | ........... B29C 44/322 |
| JP | 11-309980 | | | 11/1999 | |
| JP | 2001-226492 | | | 8/2001 | |
| JP | 2001-232986 | | | 8/2001 | |
| JP | 2005232228 | A | * | 9/2005 | |
| WO | 2016/097553 | | | 6/2016 | |
| WO | 2016/097555 | | | 6/2016 | |
| WO | 2017/220914 | | | 12/2017 | |

OTHER PUBLICATIONS

International Search Report dated Mar. 25, 2020 in corresponding international PCT Patent Application No. PCT/EP2019/085722, 5 pages.
Written Opinion dated Mar. 25, 2020 in corresponding international PCT Patent Application No. PCT/EP2019/085722, 5 pages.

* cited by examiner

*Primary Examiner* — David P Angwin
*Assistant Examiner* — Bradley S Oliver
(74) *Attorney, Agent, or Firm* — Ruggiero, McAllister & McMahon LLC

(57) ABSTRACT

There is a lead casing for pencil for writing, drawing, marking, plotting, and/or coloring, made of a composition having, by weight relative to the total weight of the lead casing for pencil: a) from 50 to 95% of a mixture of polylactic acid and bio-polyethylene in a weight ratio polylactic acid/bio-polyethylene ranging from 60/40 to 90/10, and b) from 5 to 40% of vegetable fillers chosen in the group consisting of wood fibers. There is a pencil including the lead casing for the pencil of the disclosure for writing, drawing, marking, plotting, and/or coloring as well as a method for manufacturing such a pencil.

20 Claims, No Drawings

LEAD CASING FOR PENCIL, AND PENCIL THEREOF FOR WRITING, DRAWING, MARKING, PLOTTING, AND COLORING

CROSS REFERENCE TO RELATED APPLICATIONS

This application is a National Stage Application of International Application No. PCT/EP2019/085722, filed on Dec. 17, 2019, now published as WO2020/127320, which claims priority to EP18306714.9, filed on Dec. 18, 2018, the entire contents of both of which are incorporated herein by reference.

FIELD OF THE DISCLOSURE

The present disclosure relates to a polymer-based lead casing for pencil. The is disclosure also relates to a method for manufacturing a pencil comprising a lead casing according to the disclosure. Finally, the disclosure relates to the use of a pencil comprising a lead casing for pencil according to the disclosure for writing, drawing, marking, plotting, and/or coloring.

DESCRIPTION OF THE RELATED ART

Two main families of thermoplastic polymers are used today in synthetic lead casings for pencils: styrenics such as polystyrene (PS) and acrylonitrile butadiene styrene (ABS) and polyolefins such as polyethylene (PE) and polypropylene (PP). These polymers are all from the petroleum industry. For ecological reasons, it would be interesting to be able to replace such thermoplastic polymers with biorenewable polymers.

The patent application FR2988643 describes a pencil whose lead casing (called the envelope portion in the application) is based on expanded synthetic material. It teaches that the thermoplastic materials of the lead casing portion and the lead portion may be selected from styrenic polymers such as polystyrene, polyolefins and biopolymers. Polylactic acid (PLA) is thus the only biopolymer cited, although the only example of lead casing is based on a polymer matrix of the styrenic family.

SUMMARY OF THE DISCLOSURE

The inventors have now observed that the use of PLA as the sole thermoplastic polymer in the lead casing for pencil did not make good mechanical properties in terms of resilience and impact resistance, which can cause problems in the manufacturing process and the sharpness of the final pencil. Thus, PLA "alone" does not make a good substitute for polymers derived from petroleum such as polystyrene in the manufacture of the lead casing for pencil.

The inventors, however, surprisingly observed that it was possible to manufacture a lead casing for pencil having better mechanical properties to polystyrene-based lead casings by using as a thermoplastic polymer a mixture of PLA with bio-polyethylene (bio-PE), another biopolymer, in specific proportions, in combination with an appropriate content of vegetable fillers chosen in the group consisting of wood fibers.

The present disclosure therefore relates to a lead casing for pencil which is made of a composition comprising (more specifically consisting essentially of, in particular consisting of), by weight relative to the total weight of the lead casing for pencil:

a) from 50 to 95%, more specifically from 60 to 90%, and even more specifically from 70 to 90%, of a mixture of PLA and bio-PE in a weight ratio PLA/bio-PE ranging from 60/40 to 90/10, and b) from 5 to 40%, more specifically from 7 to 30%, of vegetable fillers chosen in the group consisting of wood fibers.

Such polymer-based lead casings for pencil are intended to replace traditional lead casings made of wood, and may be referred to "synthetic wood" or "body/core synthetic". They allow the gripping of pencil and protect the lead against breakage. They must be resistant to deformation for not being bended or twisted, which would break the lead from inside. They must also be able to be cut by a traditional sharpener. They are generally made of polymer-based synthetic material whose density and sharpness are similar to those of wood and can be extruded. They can be expanded.

They also have no splinters if the pencil breaks because they are based on polymeric material.

DETAILED DESCRIPTION OF THE DISCLOSURE

According to a preferred embodiment, the lead casing for pencil of the disclosure is made of a composition comprising (more specifically consisting essentially of, in particular consisting of), by weight relative to the total weight of the lead casing for pencil:

a) from 70 to 90% of a mixture of PLA and bio-PE in a weight ratio PLA/bio-PE ranging from 60/40 to 90/10, and b) from 7 to 30% of vegetable fillers chosen in the group consisting of wood fibers.

According to a preferred embodiment, the lead casing for pencil of the disclosure is made of a composition comprising (more specifically consisting essentially of, in particular consisting of), by weight relative to the total weight of the lead casing for pencil:

a) from 80 to 90% of a mixture of PLA and bio-PE in a weight ratio PLA/bio-PE ranging from 65/35 to 85/15, and b) from 10 to 20% of vegetable fillers chosen in the group consisting of wood fibers.

The lead casing for pencil of the disclosure thus comprises a mixture of PLA, for example commercially available from NaturePlast, and bio-PE, for example commercially available from Braskem, in a weight ratio of PLA/bio-PE ranging from 60/40 to 90/10, in particular from 65/45 to 80/20, more particularly from 70/30 to 80/20, and even more particularly in a weight ratio of 70/30.

This mixture of biodegradable thermoplastic polymers serves as a matrix for the lead casing for pencil of the disclosure and makes it possible to manufacture the lead casing by extrusion and to provide good mechanical properties such as resilience and impact resistance. It also makes it possible to bring the trimming to the lead casing for pencil of the disclosure. The content of the mixture of PLA and bio-PE in the lead casing for pencil of the disclosure thus ranges from 50 to 95%, more specifically from 60 to 92%, even more specifically from 70 to 90%, and even more specifically from 80 to 90%, by weight relative to the total weight of the lead casing for pencil.

In a preferred embodiment, the bio-PE of the disclosure is partially or completely bio-based polyethylene. The term "bio-based" as used in the description indicates the inclusion of some component that derives from at least one material derived from renewable biological resources. The minimum bio-based content of the bio-PE may be of at least 50% by weight, more specifically at least 60% by weight, even more specifically at least 70% by weight, and even more specifically at least 80% by weight.

Bio-PE, also known as renewable polyethylene, is made out of ethanol, which becomes ethylene after a dehydration process. It can be made from various feedstocks including sugar cane, sugar beet and wheat grain.

The polyethylene is more specifically a low-density polyethylene, a linear low-density polyethylene, a high-density polyethylene, an ultra-high-molecular-weight polyethylene, a cross-linked polyethylene, a high density crosslinked polyethylene, a medium density polyethylene, a very low density polyethylene, as well as their copolymers and mixtures thereof. The polyethylene is more specifically a linear low density polyethylene, for example the green linear low density polyethylene commercialized by Braskem under the reference SLH218.

The bio-PE of the disclosure more specifically presents a density ranging from 0.9 to 1.0.

The lead casing for pencil of the disclosure further comprises vegetable fillers chosen in the group consisting of wood fibers. The vegetable fillers make it possible to improve the mechanical properties of the lead casing for pencil such as the flexural modulus (3 points). The vegetable fillers are chosen in the group consisting of wood fibers, more specifically in the form of powder, in particular commercially available from JRS Rettenmaier or CFF GmbH & Co. KG or Jelu-Werk or Rossow.

More specifically, the vegetable fillers of the disclosure are combined with additional fillers such as for example shellfish shells, more specifically milled shellfish shells. The shellfish shells are more specifically oyster shells, and even more specifically milled (or crushed) oyster shells. The additional filler can be more specifically milled (or crushed) oyster shells, for example commercially available from NaturePlast. The fillers can therefore consist of a mixture of wood fibers and shellfish shells, in particular a mixture of wood fibers and oyster shells such as milled (or crushed) oyster shells.

More specifically shellfish shells, even more specifically milled shellfish shells, and even more specifically milled (or crushed) oyster shells, have a volume-average diameter (d50) ranging more specifically from 10 to 160 µm, in particular from 20 to 100 µm, and more particularly from 30 to 80 µm. The volume-average diameter (d50) can for example be measured by laser particle sizing with a Mastersizer 3000 type apparatus commercially available from Malvern.

The total content of fillers (vegetable fillers+additional fillers) in the lead casing for pencil of the disclosure may range from 5 to 50%, more specifically from 7 to 40%, even more specifically from 8 to 30%, more specifically still from 9 and 20%, and in particular 10% by weight, with respect to the total weight of the lead casing for pencil.

The content of vegetable fillers in the lead casing for pencil of the disclosure ranges from 5 to 40%, more specifically from 7 to 30%, even more specifically from 10 to 20%, and in particular 15%, by weight relative to the total weight of the lead casing for pencil.

The lead casing for pencil of the disclosure may further comprise an adhesion promoter. If the adhesion promoter is present, its content ranges from 0.1 to 10%, more specifically from 1 to 5%, even more specifically from 2 to 5%, and even more specifically from 1 to 3%, by weight relative to the total weight of the lead casing for pencil. The adhesion promoter makes it possible to improve the adhesion between the thermoplastic polymer (mixture of PLA and bio-PE) and the vegetable fillers.

Thus, in a particular embodiment, the lead casing for pencil of the disclosure comprises vegetable fillers which consist of wood fibers, alone or possibly mixed with shellfish shells, more specifically milled shellfish shells, shellfish shells such as oyster shells, even more specifically milled (or crushed) oyster shells, the lead casing for pencil also comprising an adhesion promoter as defined according to the disclosure.

In a preferred embodiment, the adhesion promoter of the disclosure is a polylactic acid grafted with maleic anhydride (PLA-MA), for example commercialized by NaturePlast or NatureWorks.

The lead casing for pencil of the disclosure may comprise other additives, such as, for example, dyes and/or pigments, in particular in the form of a masterbatch, for example based on PLA, blowing agents, agents for use, lubricants, slip agents such as stearates (calcium stearate for example) and/or stearamide, performance modifiers of PLA (melt enhancer which improve the strength/consistency of the extrusion melt), in particular acrylics, and a mixture of these additives.

The content of additive in the lead casing for pencil of the disclosure when present ranges from 0.1 to 10%, and more specifically from 3 to 8% by weight, by weight relative to the total weight of the lead casing for pencil.

In particular, the lead casing for pencil of the disclosure may comprise a blowing agent, for example consisting of expandable and impervious particles, the wall of which is made of an extensible polymer material. Under the effect of temperature, a chemical or physical reaction occurs within the particles, causing an increase in the internal volume of the particles and their expansion. Thus, the blowing agent may be chosen from microspheres having a shell and enclosing a gas or a gas mixture. An increase in temperature causes an increase in the internal pressure of the microspheres that swell to a size that can be multiplied by five or more. Depending on the desired result of flexibility, weight, and any other property of the material in which the blowing agent is incorporated, the expansion is completed or not.

More specifically, the blowing agent is introduced into the composition of the lead casing in a content ranging from 0.1 and 1%, and even more specifically from 0.5 and 1%, by weight relative to the total weight of the lead casing for pencil. The blowing agent is more specifically chosen in the group consisting of citric acid, sodium bicarbonate, or mixture thereof.

The lead casing for pencil of the disclosure may also comprise dyes and/or pigments (such as red iron oxide), in particular in the form of a masterbatch, more particularly based on PLA. The content of dyes and/or pigments more specifically ranges from 0.1 to 10% by weight, in particular if the dye and/or the pigment is not in the form of a masterbatch, even more specifically from 0.1 to 5% by weight, and even more specifically from 0.5 and 3% by weight, relative to the total weight of the lead casing for pencil of the disclosure. In a preferred embodiment, the dyes and/or pigments are capable of providing a color close to the wood to the lead casing for pencil of the disclosure.

The lead casing for pencil of the disclosure may be made of a composition wherein the sum of weight % of component a) (mixture of PLA and bio-PE), components b) (vegetable fillers) and optional other component(s) such as additional fillers, adhesion promoters, dyes, pigments, blowing agents, agents for use, lubricants, slip agents, performance modifiers, etc., represents 100%.

The lead casing for pencil of the disclosure is more specifically extrudable. It is also more specifically shaped and can have in particular the density and the sharpness approximating those of wood. In particular, the pencil can be cut by a traditional pencil sharpener. Therefore, it is not the lead casing for pencil of a mechanical pencil.

The present disclosure further relates to a pencil for writing, drawing, marking, plotting, and/or coloring, comprising a lead casing for pencil according to the disclosure. The pencil of the disclosure is not a mechanical pencil.

In the pencil of the disclosure, the lead casing more specifically surrounds, in particular concentrically, the lead or a protective intermediate layer disposed between the lead and the lead casing of the disclosure. In a particular embodiment of the disclosure, the pencil of the disclosure comprises an additional layer of decoration, more specifically varnish, surrounding, in particular concentrically, the lead casing of the disclosure. More specifically, the decorative layer is made of a material compatible with that of the lead casing of the disclosure.

According to a preferred embodiment, the lead of the lead casing of the disclosure is a polymer-based lead, and not a calcined lead.

In a particular embodiment of the disclosure, the pencil of the disclosure is obtained by extrusion, in particular by coextrusion of the lead/optional protective layer/lead casing according to the disclosure/optional decorative layer. In a preferred embodiment, the coextrusion makes it possible to prepare in a single step a continuous ring consisting of the four aforementioned layers of the pencil, these being assembled in the chosen order lead/optional protective layer/lead casing according to the disclosure/optional decorative layer. For this, four single-screw extruders each delivering the material constituting a layer are connected in a coextrusion head tooling associating in the right order the layers between them.

Multiple extrusion techniques are well known to the person skilled in the art. By way of example, such methods for continuously manufacturing pencils are described in document U.S. Pat. No. 6,572,295.

According to a preferred embodiment, the pencil of the disclosure is a graphite pencil and/or a colored pencil. The formulation of the lead may vary depending on whether the pencil is a graphite pencil or a colored pencil. An example of formulation of a graphite lead is described in the application WO2016/097553. The formulation of a colored lead may exist in two forms: polyolefin-based erasable formulation as described in the application WO2016/097555 or styrenic-based standard formulation as described in the application WO2017/220914.

In a particular embodiment of the disclosure, the lead has a diameter of between 2 and 3.6 mm. In a graphite pencil, the diameter of the lead may more specifically vary from 2 to 2.5 mm. In a colored pencil, the diameter of the lead may more specifically vary from 3 to 3.5 mm.

In the case of a graphite pencil, carbon black may be added to the lead, and thus considered as a pigment. In this case, graphite may vary from 40 to 60% by weight and carbon black from 0 to 10% by weight, relative to the total weight of the lead.

The pencil of the disclosure more specifically has a hexagonal, round or triangular section, even more specifically round or hexagonal.

More specifically, the pencil of the disclosure comprises means for erasing, such as an eraser, at the uncut end of the pencil.

In addition to the above provisions, the disclosure also comprises other provisions which will emerge from the remainder of the description which follows.

EXAMPLES

Two compositions A and B of lead casing were prepared.

Composition A (invention) was a mixture of PLA/bio-PE (NaturePlast PLE 005-1 and Braskem SLH218) in a weight ratio of 80/20, added with 15% by weight of wood fibers (LIGNOCEL® JRS).

Composition B (comparative) was a mixture of polylactic acid/polybutylene succinate PLA/PBS (NaturePlast PLE 005-1 and PBE 003) in a weight ratio of 80/20, added with 15% by weight of wood fibers (LIGNOCEL® JRS).

Pencils with hexagonal section were manufactured by coextrusion with a color lead made of acrylonitrile-butadiene-styrene (ABS) (composition in % by weight relative to the total weight of the lead: 40% ABS copolymer, 12.5% kaolin, 27.5% calcium stearate, 20% additive), a sheath, a lead casing of composition A (invention) is or of composition B (comparative), and a varnish. The thickness of the lead casing is 4.5 mm.

The performance of the pencils made of the lead casings of compositions A and B were tested according to the following tests:

The sharpen strength resistance test was measured in order to assess the force needed to cut a pencil. The characteristics of the test were as follows:

Equipment: computer, force sensor (AMETEK Sensors) and cutting device

Descent speed of the pencil: 70 mm·min$^{-1}$

Operating mode:

1. Locate the pencils and indicate the weight of each pencil.

2. Check that all three devices are on.

3. On the moving part of the pencil sharpener, use the appropriate support depending on the pencil to be tested.

4. Fix the pencil in the chuck, not cut side.

5. Lower the pencil holder by acting on the clip to engage the sharp side of the pencil in the hole of the device.

6. Turn on the sharpener.

7. Record the results after stopping the pencil sharpener.

The results were expressed in N·mm.

The lead resistance at 45° of the pencils made of the lead casings of compositions A and B was tested with a Dynamometer Chatillon instrument type TCM 201-M, according to the following operating mode:

1. Position the pencil in a support with a 45° inclination, descend the pencil at a descent speed of 50 mm·min$^{-1}$, and come into contact with a metal plate until the lead breaks.

2. Read the value of the result displayed on the dynamometer.

The result was the measure of the force required to break the mine, expressed in daN.

The results of the pencils made of the lead casings of compositions A and B are summarized in the following Table 1:

TABLE 1

|  | Composition A (invention) | Composition B (comparative) |
|---|---|---|
| Sharpen strength resistance (N · mm) | 89.58 | 159.52 |
| Lead resistance at 45° (daN) | 2.06 | 1.46 |

The results presented in Table 1 show lower sharpen strength resistance for composition A (invention) than for the comparative composition B. A lower value of sharpen strength resistance means that a lower force is required to sharpen the pencil of the disclosure, thereby improving the ease of sharpening. In addition, there was no problem with the lead made of the lead casing of composition A during the sharpening of the pencil: the lead did not break and did not take off the pencil.

The results presented in Table 1 also show better lead resistance at 45° for the pencil according to the disclosure made of the lead casing of composition A with respect to the comparative pencil made of the lead casing of composition B.

The invention claimed is:

1. A lead casing for a pencil, comprising a composition including, by weight relative to a total weight of the lead casing for the pencil:
   a) from 50 to 95% of a mixture of polylactic acid and bio-polyethylene in a weight ratio polylactic acid/bio-polyethylene ranging from 60/40 to 90/10, and
   b) from 5 to 40% of vegetable fillers selected from the group consisting of wood fibers.

2. A lead casing for the pencil according to claim 1, comprising, by weight relative to a total weight of the lead casing for the pencil:
   a) from 60 to 95% of a mixture of polylactic acid and bio-polyethylene in a weight ratio polylactic acid/bio-polyethylene ranging from 60/40 to 90/10, and
   b) from 7 to 30% of vegetable fillers selected from the group consisting of wood fibers.

3. The lead casing for the pencil according to claim 1, comprising, by weight relative to the total weight of the lead casing for the pencil:
   a) from 80 to 90% of a mixture of polylactic acid and bio-polyethylene in a weight ratio polylactic acid/bio-polyethylene ranging from 65/35 to 85/15, and
   b) from 10 to 20% of vegetable fillers selected from the group consisting of wood fibers.

4. A lead casing for the pencil according to claim 1, wherein the weight ratio polylactic acid/polybutylene adipate terephthalate is ranging from 65/45 to 80/20.

5. The lead casing for the pencil according to claim 1, wherein the composition comprises an additional filler different from the vegetable fillers.

6. The lead casing for the pencil according to claim 5, wherein the additional filler is selected from the group consisting of shellfish shells.

7. The lead casing for the pencil according to claim 5, wherein the additional filler is milled oyster shells.

8. The lead casing for the pencil according to claim 1, wherein the total content of filler ranges from 5 to 50%, by weight, with respect to total weight of the lead casing.

9. The lead casing for the pencil according to claim 1, wherein the total content of filler ranges from 7 to 40%, by weight, with respect to total weight of the lead casing.

10. The lead casing for the pencil according to claim 1, wherein the total content of filler ranges from 8 to 30%, by weight, with respect to total weight of the lead casing.

11. The lead casing for the pencil according to claim 1, wherein the total content of filler ranges from 9 to 20%, by weight with respect to total weight of the lead casing.

12. The lead casing for the pencil according to claim 1, wherein a content of mineral filler ranges from 5 to 40% by weight, relative to the total weight of the lead casing.

13. The lead casing for the pencil according to claim 1, further comprising at least one additive selected from the group consisting of dyes, pigments, blowing agent, agents for use, lubricants, slip agents, performance modifiers of polylactic acid, and their mixtures.

14. The lead casing for the pencil according to claim 4, wherein the additive represents from 0.1 to 10% by weight, relative to the total weight of the lead casing for the pencil.

15. The lead casing for the pencil according to claim 1, further comprising an adhesion promoter.

16. The lead casing for the pencil according to claim 15, wherein the adhesion promoter is a polylactic acid grafted with maleic anhydride (PLA-MA).

17. A pencil comprising a lead casing for the pencil according to claim 1 surrounding a lead.

18. The pencil according to claim 17, wherein the lead includes at least graphite and/or pigments.

19. The pencil according to claim 17, being a graphite pencil and/or a colored pencil.

20. A method for manufacturing a pencil according to claim 17, wherein the constituents of the lead casing for the pencil are coextruded around the constituents of the lead.

* * * * *